United States Patent Office 3,135,277
Patented June 2, 1964

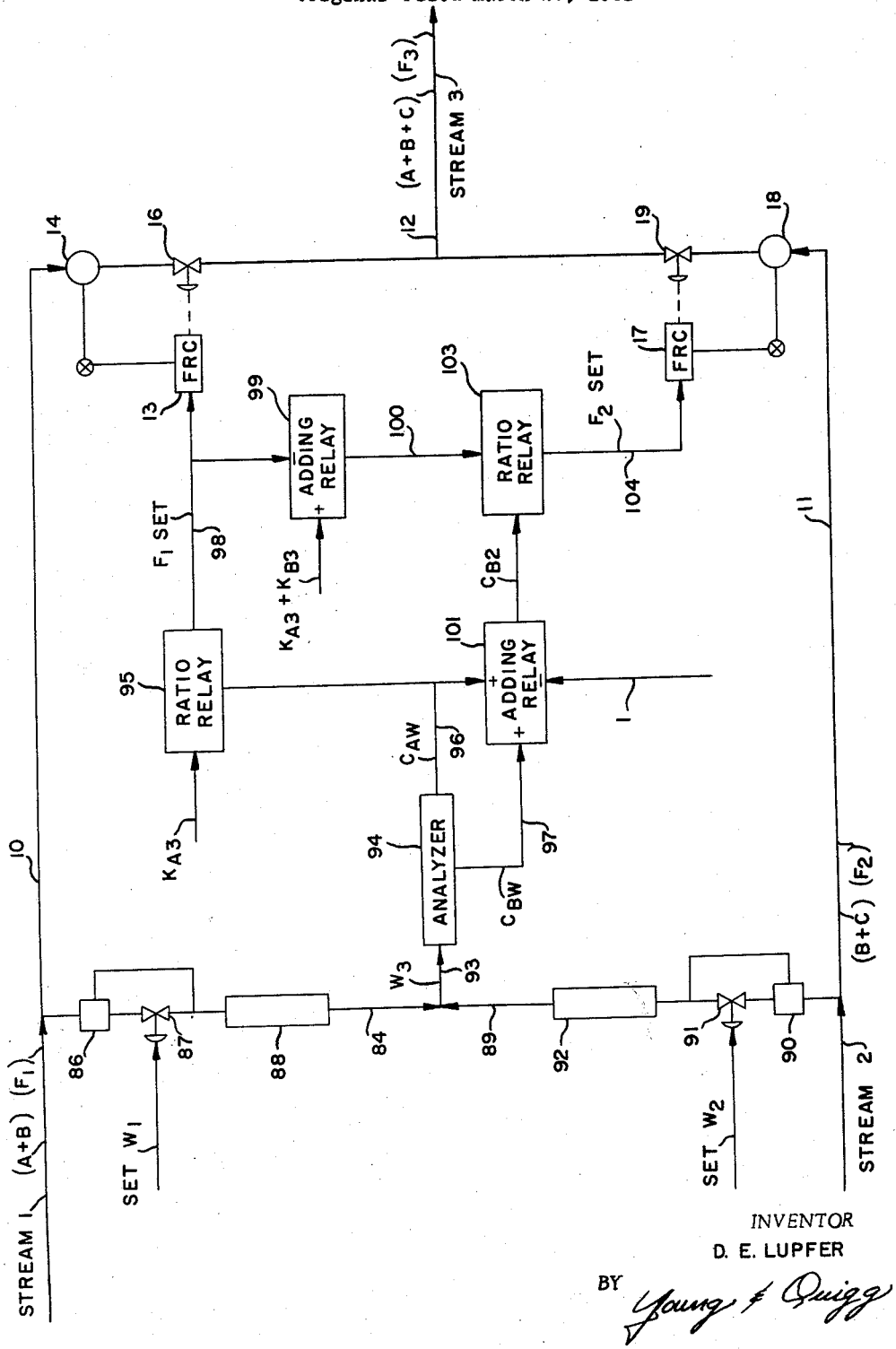

3,135,277
STREAM BLENDING METHOD AND APPARATUS
Dale E. Lupfer, Bartlesville, Okla., assignor to Phillips Petroleum Company, a corporation of Delaware
Original application Mar. 27, 1961, Ser. No. 98,544, now Patent No. 3,095,887, dated July 2, 1963. Divided and this application Jan. 18, 1963, Ser. No. 252,350
4 Claims. (Cl. 137—3)

This invention relates to a method and to apparatus for blending multicomponent streams in variable ratios to produce a combined stream having controlled composition and flow rate.

This is a divisional application of my copending application Serial No. 98,544, filed March 27, 1961, now Patent No. 3,095,887.

Ordinarily the control of stream blending is accomplished by first blending the streams, then analyzing the composition of the resultant blend, and finally correcting the ratio in which the streams are blended as necessary to obtain the desired analysis. This method necessarily results in some off-specification blend because a deviation from the desired result is required in order to prompt a correction. This general method is known as "feedback" control. Flow rates of both feed streams must be controlled in order to maintain the blend stream constant in composition and in flow rate. Feedback control methods commonly involve interacting controls. By this is meant that a correction in the flow of one feed stream necessitates a correction in the flow of the second and vice versa. Off-specification blend is produced during the time required for the controls to reach equilibrium.

There are frequently situations in which existing physical limitations make it impossible or impractical to sample a blended stream for control purposes. For example, if two streams are fed separately to a reactor there is no way of determining by direct sample the composition of the combined streams prior to reaction. A comparable situation exists if the common conduit through which two such streams flow into a vessel is too short to effect thorough mixing, in which case a sample of material withdrawn from this conduit would not provide an analysis representative of the mixture.

According to my invention a "feed forward" control method and apparatus are provided which overcome the above discussed disadvantages. The method and apparatus of my invention can be employed to blend continuously a first fluid stream consisting essentially of components A and B in variable ratio with a second fluid stream consisting essentially of components B and C in variable ratio to form a third stream containing components A and B in a substantially constant ratio and flow rate, wherein component C can be any material or mixture of materials different from components A and B. This control is accomplished by forming a sample stream from equal portions taken from the first and second streams and analyzing the sample stream for components A and B, producing a first signal as a function of the fraction of said first stream that is component A, producing a second signal as a function of the ratio of said fraction to the desired flow rate of component A in said third stream, and regulating the flow rate of said first stream in response to said second signal. The flow rate of the second stream is regulated in response to a signal which is a function of the ratio $X/Y$ where $X$ is the difference between the desired total flow rates of components A and B in said third stream and the flow rate of said first stream, and $Y$ is the sum of twice the fractions of said sample stream which are components A and B minus 1.

The apparatus of my invention comprises first and second feed conduits connected to an outlet conduit with flow regulating means in each of said feed conduits, means for withdrawing equal portions of material from the first and second conduits to form a sample stream, analyzing means connected to receive said sample stream and produce a first signal as a function of the fraction of said sample stream that is a first component and a second signal as a function of the fraction of the sample stream that is a second component, computing means connected to receive said first signal for producing a third signal as a function of the ratio between the desired flow rate of said first component in the outlet conduit and twice the fraction of said sample stream that is said first component, means for manipulating the flow regulating means in said first conduit in response to said third signal, means for producing a fourth signal as a function of the difference between the desired total flow rates of both components in the outlet conduit and the flow rate of material in said first conduit, means for producing a fifth signal as a function of the sum of twice the fractions of said sample stream which are said components minus 1, and means for regulating the flow rate of the second stream in response to a signal which is a function of the ratio between said fourth and fifth signals.

It is an object of my invention to provide both method and apparatus for blending streams containing multiple components in variable ratios to produce a combined stream having controlled composition and flow rate of specific components. Another object of my invention is to provide a feed forward control system for blending two streams to produce a third stream of controlled composition and flow rate. Still another object is to provide a non-interacting control method for blending fluid streams. Another object is to provide in a polymerization process a method of controlling the feed streams in order to obtain a substantially constant monomer charge and constant ratio of monomer to solvent. Other objects, advantages and features of my invention will be apparent to those skilled in the art from the following disclosure and drawing which is a schematic drawing of the control features of my invention for blending two streams wherein each stream contains two components in variable ratio, one of said components being common to both streams.

The control features of this invention have broad utility in the blending of two fluid streams to produce a third stream of desired composition and flow rate. For example, it is particularly useful in dilution processes wherein a feed stream containing an additive is blended with more of the feed stream which does not contain the additive or which contains inert materials in variable amounts to produce a final stream which contains the additive in fixed ratio to the principal component. Alternatively the features of the invention can be applied to injecting an additive into a stream which already contains the additive in variable amounts. Gasoline blending is one such application and there are many more which will occur to those skilled in the art. Of particular importance in the utilization of our invention are polymerization processes wherein an accurate control must be maintained over the rate at which monomer is fed to the polymerization zone as well as over the ratio which this monomer bears to the added solvent. An example of such a process is the solution polymerization of olefins, particularly conjugated dienes, in the presence of organometal catalyst, such as trialkylaluminum and titanium halide, and hydrocarbon solvents.

Referring now the drawing for a better understanding of my invention, two conduits 10 and 11 are shown uniting at a junction with a third outlet conduit 12. Stream 1 consisting essentially of components A and B flows through conduit 10 while stream 2 consisting essentially of components B and C flows through conduit 11.

Stream 3 in conduit 12 is the blend of streams 1 and 2 and contains components A, B and C.

The flow of material through conduit 10 is maintained substantially constant by linear flow recorder controller 13 which is operatively connected to flow sensing element 14 and motor valve 16 in conduit 10. In like manner the flow through conduit 11 is maintained substantially constant by linear flow recorder controller 17 which is operatively connected to flow sensing element 18 and motor valve 19 in line 11. The rates of flow which are maintained in these conduits by controllers 13 and 17 are determined by the set points of said controllers which are in turn manipulated as will be described. Analyzer 94 can be any of a number of conventional analyzers such as a differential refractometer, an infrared anlyzer, an ultra-violet analyzer, a chromatographic analyzer, or the like. The type of instrument chosen will depend upon the type of material in the streams to be blended. For example, I prefer to use a vapor phase chromatographic analyzer with hydrocarbon streams of olefin and solvent. An example of a suitable instrument is a Perkin-Elmer Model 184 Process Fractometer modified for liquid sampling as described in U.S. Patent 2,757,541 to Watson et al. For 0–10 percent butadiene in toluene streams, I prefer to use such an instrument with a control unit as described in copending application Serial No. 777,995 of M. C. Burk, filed December 3, 1958, now Patent No. 3,094,862 and a Philbrick U.S.A.-4JT operational amplifier or similar integrator for obtaining butadiene peak area. The output of such an instrument is a quantitative measurement of butadiene concentration on a 2 minute analysis cycle. With the same instrument analyses of both butadiene and toluene can be obtained.

The individual instruments shown are well known and commercially available. It is not the intention that any one of these components be claimed as the invention here. It is the combination, rather, of these control features and components to produce the valuable method and system of stream blending which constitutes the subject invention. A number of instruments suitable for use as flow sensing elements 14 and 18 are, for example, well known in the art. A turbine-type flow meter with a frequency converter and manual specific gravity adjustment is preferred for this service where the streams involved are hydrocarbon, such as butadiene and toluene. Flow controllers are likewise standard items and as indicated above the relays can be pneumatic or electronic. For example, in electronic relays conventional operational amplifiers and log function generators can be employed to produce outputs representative of the ratio of two input signals. Adding operational amplifiers with auxiliary amplifiers for changing the sign of one input signal can be employed to obtain the function of the difference between the two input signals.

In a reaction for polymerization of monomers such as butadiene in a solvent such as toluene, very frequently inert materials such as low boiling hydrocarbons, for example, butylenes and butane, are introduced with the make-up monomer.

In situations wherein the presence of a third component in stream 2 cannot be neglected, the embodiment shown can be employed to obtain the resired results. Stream 1 flowing in conduit 10 contains components A and B with a flow rate $F_1$. Stream 2 flowing in conduit 11 contains components B and C with a flow rate $F_2$, while stream 3 contains components A, B and C and has a flow rate $F_3$. In this case it is desired to maintain the flow rates of components A and B in stream 3 substantially constant. The flow rate of component C can vary and, therefore, the total flow rate of stream 3 can vary by whatever amount component C varies. Since component C is an inert material which does not affect the reaction, it is the flow rates and the ratios of components A and B which should be maintained constant.

Proceeding now with the description of the control as shown a portion of stream 1 is withdrawn from conduit 10 through conduit 84. The flow of materials through conduit 84 is maintained constant by differential pressure flow controller 86 connected around orifice valve 87 in conduit 84. This flow rate ($W_1$) is indicated by rotameter 88 and is established by setting valve 87. A specimen of material is also withdrawn from stream 2 in conduit 11 by way of conduit 89. The flow of material through conduit 89 is maintained constant by controller 90 connected around orifice valve 91 in conduit 89. This flow ($W_2$) is indicated by rotameter 92 and is established by setting valve 91. As an example of commercial equipment suitable for controllers 86 and 90, differential pressure flow controllers Type 63BD of Moore Products Company can be used. The material in conduits 84 and 89 unite in conduit 93 to provide a sample stream having a flow rate $W_3$. Controllers 86 and 90 are regulated so that flow rate $W_1$ equals $W_2$; therefore flow rate $W_3$ equals $2 \times W_1$. Sample stream in conduit 93 is then fed to analyzer 94 which is equipped to produce two outputs, output 96 ($C_{AW}$) as a function of the concentration of component A in sample stream 93 and output 97 ($C_{BW}$) as a function of component B in sample stream 93. Output 96 is transmitted to ratio relay 95 together with input $K_{A3}$ which is the desired flow rate of component A in stream 3. Since the sample from stream 1 has been diluted 100 percent with material from stream 2, the analysis $C_{AW}$ for component A in sample stream 93 is one half the fraction of stream 1 which is component A. A bias factor of 2 is, therefore, applied to input 96 in relay 95. Output 98 from relay 95 is a function of the flow rate of stream 1 in conduit 10, $F_1$, and is used to manipulate the set point of controller 13. This output is also transmitted to adding relay 99 into which is also fed an input which is equal to the sum of the desired flow rates of component A in stream 3, $K_{A3}$, and the desired flow rate of component B in stream 3, $K_{B3}$. Signal 98 is fed to a negative input of relay 99 so that the output signal 100 is a function of the difference between the sum of the desired flow rates of components A and B in stream 3 and the flow rate of stream 1. Since components A and B make-up substantially all of stream 1, this difference represents the flow rate of component B in stream 3 which is supplied by stream 2. Signal 100 is, therefore, a function of the mass flow rate of component B in stream 2 ($F_{B2}$).

Signals 96 and 97 are fed to adding relay 101 wherein these signals are multiplied by 2 and added and from this sum is subtracted a signal which is the function of 1. The constant signal which is a function of 1 is fed to the negative input of relay 101. Output 102 of relay 101 is a function of a concentration of component B in stream 2. This can be shown to be true as follows:

Let $W_1$, $W_2$ and $W_3$ equal the flow rates of the sample streams in conduits 84, 89 and 93 respectively. Also let $C_{BW}$ equal the concentration of component B in the combined sample stream 93, $C_{B1}$ equal the concentration of component B in stream 1, and $C_{B2}$ equal the concentration of component B in stream 2. Also let $C_{A1}$ equal the concentration of component A in stream 1 and $C_{AW}$ equal the concentration of component A in sample stream 93. These concentrations are expressed as a fraction of total stream involved. Since stream 1 consists essentially of components A and B, $C_{B1} + C_{A1} = 1$. Also since all of component A in sample stream 93 comes from stream 1, and since sample stream 84 is diluted with equal parts by weight of sample stream 89, the concentration of component A in stream 93 is ½ the concentration of component A in sample stream 84, or in stream 1. Therefore, $C_{A1} = 2C_{AW}$. The mass flow rate of component B in sample stream 93 ($W_3 C_{BW}$) equals the flow rate of B in stream 84 ($W_1 C_{B1}$) plus the flow rate of B in stream 89 ($W_2 C_{B2}$). There are, therefore, the following equations:

$$W_3 C_{BW} = W_1 C_{B1} + W_2 C_{B2}$$

Since $$W_1 = W_2 \text{ and } 2W_1 = W_3$$

therefore $$2W_1 C_{BW} = W_1 C_{B1} + W_1 C_{B2}$$

or $$2C_{BW} = C_{B1} + C_{B2}$$

Since $$C_{B1} = 1 - C_{A1}, \text{ and } C_{A1} = 2C_{AW}$$

therefore $$2C_{BW} = 1 - 2C_{AW} + C_{B2}$$

or $$C_{B2} = 2C_{AW} + 2C_{BW} - 1$$

Since the concentration of component B in stream 2 times the flow rate of stream 2 ($C_{B2} \times F_2$) is equal to the flow rate of component B in stream 2 ($F_{B2}$), it follows that the flow rate of stream 2 ($F_2$) is equal to the ratio of the flow rate of component B in stream 2 divided by the concentration of component B in stream 2

$$(F_2 = F_{B2}/C_{B2})$$

Inputs 100 and 102 are, therefore, fed to ratio relay 103 which produces a signal 104 as a function of the necessary flow rate, $F_2$, for stream 2 in order to produce the desired flow rate of component B in stream 3. Signal 104 is employed to manipulate the set point of controller 17. The computer circuits can be either pneumatic or electronic analog circuits. The individual components shown are commercially available. Ratio relay 95 can be a pneumatic or electronic instrument. For example, a Foxboro Type 57ZSR ratio relay is suitable. Adding relay 99 can suitably be a Foxboro adding relay Type 56.

In order to explain my invention further the following example is presented. The proportions and conditions given are typical only and should not be construed to limit my invention unduly.

*Example I*

With a system as shown in the drawing a butadiene-toluene feed stream as stream 1 normally containing 4.992 weight percent butadiene and the remainder toluene with a stream flow rate of 1322 lbs./min. is combined with stream 2 containing butadiene and butylenes, the fraction of butylenes being 2 weight percent. The total stream flow rate of stream 2 is 149 lbs./min. The resulting product is a combined feed stream 3 containing toluene-butadiene and butylenes with a total flow rate of toluene and butadiene of 1468 lbs./min. and a ratio of toluene to butadiene of 5.92. Assume that the concentration of butadiene in stream 1 changes to 8 percent and the concentration of butylenes in stream 2 changes to 4 percent. According to the control system this produces a change in the analysis of the sample stream fed to analyzer 94 so that the flow rates of streams 1 and 2 are automatically adjusted to 1365.22 lbs./min. and 107.06 lbs./min. respectively, thereby maintaining the desired composition in stream 3.

As will be apparent to those skilled in the art various modifications can be made in my invention without departing from the spirit or scope thereof.

I claim:

1. A method of continuously blending a first fluid stream consisting essentially of components A and B in variable ratio with a second fluid stream consisting essentially of components B and C in variable ratio to form a third stream containing components A and B in a substantially constant ratio and flow rate which comprises analyzing a fourth stream of combined equal samples of said first and second streams for component A and for component B, producing first and second signals as functions of the fractions of said fourth stream that are components A and B respectively, producing a third signal as a function of the sum of twice said first and second signals less 1, producing a fourth signal as a function of the ratio of twice said first signal to the desired flow rate of component A in said third stream, regulating the flow rate of said first stream in response to said fourth signal, producing a fifth signal as a function of the difference between said fourth signal and the sum of the desired flow rates of components A and B in said third stream, producing a sixth signal as a function of the ratio between said third and fifth signals, and regulating the flow rate of said second stream in response to said sixth signal.

2. A method of continuously blending a first fluid stream consisting essentially of components A and B in variable ratio with a second fluid stream consisting essentially of components B and C in variable ratio to form a third stream containing components A and B in a substantially constant ratio and flow rate which comprises regulating said first and second streams at substantially constant predetermined first and second flow rates respectively, withdrawing equal portions of material from said first and second streams to form a sample stream, analyzing said sample stream for component A and for component B and producing from the resultant analyses first and second signals as functions of the fractions of said sample streams that are components A and B respectively, producing from said first signal and a constant signal representative of the desired flow rate of component A in said third stream a third signal as a function of the ratio between said desired flow rate of component A and twice the fraction of said sample that is component A, manipulating said first predetermined flow rate in response to said third signal in order to maintain the flow rate of component A in said third stream substantially constant, producing from said third signal and a constant signal representative of the desired total flow rate of components A and B in said third stream a fourth signal as a function of the difference between said desired total flow rate of components A and B and the flow rate of said first stream, producing from said first and second signals and a constant signal representative of −1 a fifth signal as a function of the sum of twice the fractions of said sample stream which are components A and B and −1, producing from said fourth and fifth signals a sixth signal as a function of the ratio between said fourth and fifth signals, and manipulating said second predetermined flow rate in response to said sixth signal in order to maintain the flow rate of component B in said third stream substantially constant.

3. The method of claim 2 wherein component A is toluene, component B is butadiene and component C is inert, low boiling hydrocarbon.

4. Stream blending apparatus comprising first and second feed conduits connected to an outlet conduit, first and second rate of flow regulating means in said first and second conduits respectively, means for analyzing for first and second components of a sample stream and producing first and second signals as functions of the fractions of said sample stream which are said first and second components respectively, means for withdrawing equal portions of material from said first and second conduits to form said sample stream and for passing same to said analyzing means, means for computing a first ratio between the desired constant mass flow rate of said first component in said outlet conduit and twice the fraction of said sample that is said first component and for producing a third signal as a function of said first ratio connected to receive said first signal, means for manipulating said first rate of flow regulating means connected to receive said third signal, means for computing the difference between the total desired constant flow rate of said first and second components in said outlet conduit and the flow rate of material in said first conduit and for producing a fourth signal as a function of said difference connected to receive said third signal, means for computing the sum of twice the fractions of said sample stream which are said first and second components and −1 and for producing a fifth signal as a function of said sum connected to receive said first and second signals, means for computing a second ratio between said fourth and fifth signals and for producing a sixth signal as a function of said second ratio connected to receive said fourth and fifth signals, and means for manipulating said second rate of flow regulating means connected to receive said sixth signal.

References Cited in the file of this patent

UNITED STATES PATENTS

| | | |
|---|---|---|
| 2,868,216 | Robertson | Jan. 13, 1959 |
| 2,881,235 | Van Pool | Apr. 7, 1959 |